(12) United States Patent
Kim et al.

(10) Patent No.: US 6,292,304 B1
(45) Date of Patent: Sep. 18, 2001

(54) APPARATUS FOR GENERATING INDEPENDENT COHERENT BEAM ARRAY

(75) Inventors: Jideog Kim, Seoul; In Young Lee, Suwon; Sukhan Lee, Seongnam, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/562,030

(22) Filed: May 1, 2000

(30) Foreign Application Priority Data

Sep. 2, 1999 (KR) .................................................. 99-37104

(51) Int. Cl.[7] ............................. G02B 27/30; G02B 27/14
(52) U.S. Cl. ..................... 359/641; 359/629; 359/558; 359/559; 359/291; 359/292
(58) Field of Search ..................................... 359/267, 558, 359/559, 566, 572, 618, 630, 7, 11, 291, 292, 298, 629, 641; 349/74; 382/210

(56) References Cited

U.S. PATENT DOCUMENTS

| | | | |
|---|---|---|---|
| 4,877,297 | * 10/1989 | Yeh | 359/11 |
| 4,988,153 | 1/1991 | Paek | 359/15 |
| 5,121,228 | * 6/1992 | Paek | 359/7 |
| 5,497,254 | * 3/1996 | Amako | 349/74 |
| 5,740,276 | * 4/1998 | Tomoko | 382/210 |

* cited by examiner

*Primary Examiner*—Georgia Epps
*Assistant Examiner*—Gary O'Neill
(74) *Attorney, Agent, or Firm*—Burns, Doane, Swecker & Mathis, L.L.P.

(57) ABSTRACT

An apparatus for generating an independent coherent beam array from a single light source, in which individual coherent beams are selectively activated. The independent coherent beam array generating apparatus, which ensures high-efficient independent coherent beams from a single light source, are implemented by using a phase grating and a spacial light modulator. The number of multiple beams to be used as a light source for high-density recording and reading can be adjusted by varying the design of the phase grating. Regardless of the number of light sources required in various applications, once the beam array generating apparatus is adopted to the applications, the desired function of the applications can be implemented at low cost.

5 Claims, 7 Drawing Sheets

APPARATUS FOR GENERATING INDEPENDENT COHERENT BEAM ARRAY

The present application is based on Korean Application No. 99-37104 filed on Sep. 2, 1999, herein incorporated by reference.

BACKGROUND OF THE INVENTION

1. Field of the Invention

The present invention relates to an apparatus for generating an independent coherent beam array from a single light source, and more particularly, to an apparatus for generating an independent coherent beam array in which beams are independently switched for recording and reading operations.

2. Description of the Related Art

Figure 1:
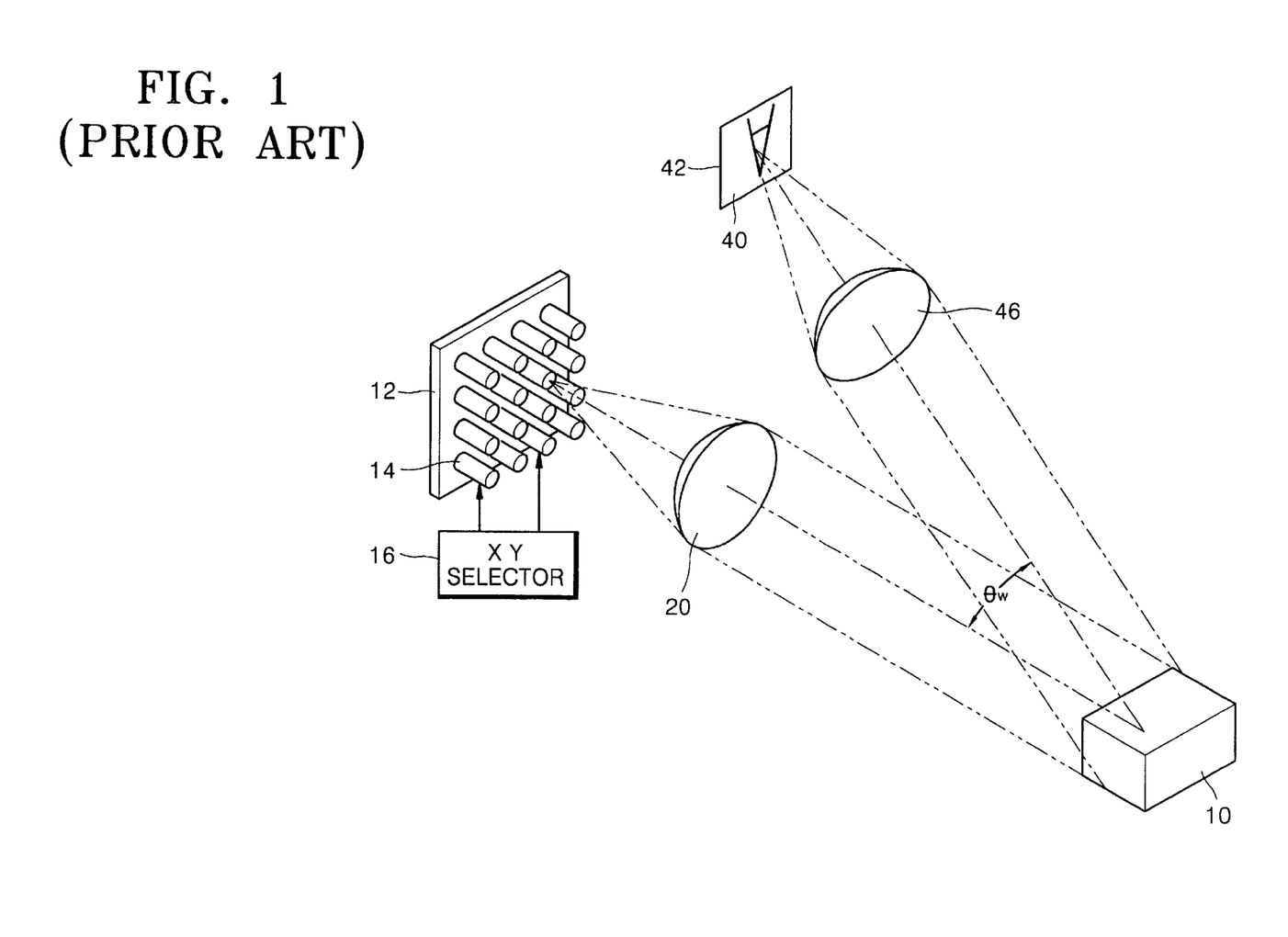
FIG. 1 is a schematic view of a conventional apparatus for generating an independent coherent beam array.

FIG. 1 illustrates a conventional coherent beam array adapted in a holographic memory, which has been suggested in U.S. Pat. No. 4,988,153. In the coherent beam array, a plurality of vertical cavity surface emitting laser (VCSEL) diodes 14 form a two-dimensional laser diode array 12 as a light source. An XY selector 16 allows for selective electrical activation of a single or several VCSEL diodes in sequence.

The output beam from the selected VCSEL diode is converted into a collimated beam by a collimating lens 20. The position of the selected VCSEL diode, the X-Y coordinate of the selected VCSEL diode on the two-dimensional laser diode array 12, causes a small change in the incident angle of the collimated beam upon a holographic recording medium 10.

Images can be written to or read from the holographic recording medium 10 by collimated beams generated from the coherent beam array. During recording, an image 40 is presented on an image light source 42 and is recorded through a recording collimating lens 46 on the recording medium 10. The writing angle $\theta_W$ between the collimated beams respectively from the collimating lens 42 and the recording collimating lens 46, which are incident upon the recording medium 10, is varied, which allows multiple independent images to be superimposed and sequentially written to the recording medium 10. Although not illustrated, during reading, images recorded on the recording medium 10 are read out only by the collimated beam, of which the incident angle upon the recording medium 10 for reading is the same as that of the reference collimated beam.

The coherent beam array generating apparatus having the above-mentioned configuration can be applied to holographic information storing devices or displays, for optical interconnections therein, which require several tens to several hundreds of light sources. The manufacture of the VCSEL 12 is technically difficult, particularly in controlling the heat generated from laser diodes thereof and in maintaining the uniformity in the intensity of laser beams as well as irradiation angle of the laser beams, which increases the manufacturing cost and produces a low yield.

SUMMARY OF THE INVENTION

To solve the above problems, it is an object of the present invention to provide an apparatus for generating an independent coherent beam array from a single light source, in which coherent beams can be independently activated for recording and reading operations.

The above object of the present invention is achieved by an apparatus for generating an independent coherent beam array, comprising: a single light source; a first collimating lens for collimating the beam emanated from the light source; a phase grating for splitting the collimated beam from the first collimating lens into a plurality of diffraction beams; a Fourier transform lens for focusing the diffraction beams from the phase grating into beam spots by Fourier transformation; a reflective spatial light modulator for selectively reflecting the beam spots from the Fourier transform lens; a polarizing beam splitter for passing the beam spots from the Fourier transform lens toward the reflective spatial light modulator, and changing the path of the beams reflected by the reflective spatial light modulator; and a second collimating lens for collimating the beams reflected by the reflective spatial light modulator and incident via the polarizing beam splitter.

Preferably, assuming that grating periods for the X- and Y-axis directions of the phase grating are $d_x$ and $d_y$, respectively, and the wavelength of the beam emanated from the light source is $\lambda$, the focal length of the Fourier transform lens is f, the distances between spots focused onto the reflective spatial light modulator in the X-axis and Y-axis directions, $S_x$ and $S_y$, respectively, are expressed by equations $$S_x = \frac{\lambda f}{d_x}$$

$$S_y = \frac{\lambda f}{d_y}.$$

Also, the reflective spatial light modulator may be constructed of a micro-mirror reflector or a reflective liquid crystal display panel.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

An apparatus for generating an independent coherent beam array according to the present invention is described by a highly efficient coherent beam array that can be generated from a single light source by means of a phase grating and a spatial light modulator (SLM). Further coherent beams in the beam array can be selectively activated for recording and reading operations.

In particular, the phase grating produces a plurality of coherent beams that form an array, from a single light source, and a reflective SLM selectively activates independent coherent beams of the array. In other words, the cooperation of the phase grating and the SLM enables implementation of the present invention. The independent coherent beam array generating apparatus according to the present invention can be applied to spatial multiplexing holographic information storing devices for rapid addressing of a reference beam, and one- or two-dimensional displays and the like which require optical interconnections therein.

Figure 2:
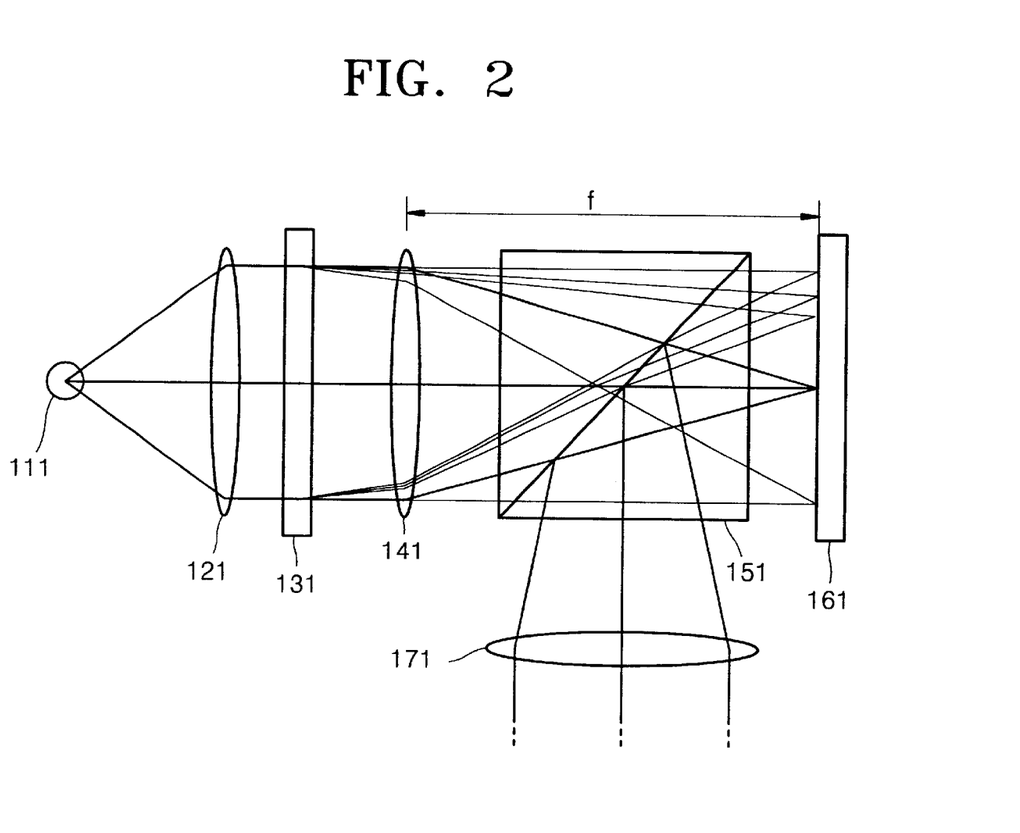
FIG. 2 is a schematic view of an apparatus for generating an independent coherent beam array according to the present invention.

FIG. 2 is a schematic view of an apparatus for generating an independent coherent beam array according to the present invention. As shown in FIG. 2, the independent coherent beam array generating apparatus includes a single light source 111, a first collimating lens 121 for collimating the conical beam from the light source 111, a phase grating 131 for generating a multiple-beam array from the collimated beam, a Fourier transform lens 141, a polarizing beam splitter 151, a reflective spatial light modulator (SLM) 161, and a second collimating lens 171.

In the operation of the coherent beam array generating apparatus in FIG. 1, the conical beam from the single light source 111 is converted into a collimated beam by the first collimating lens 121. The collimated beam is changed into a one- or two-dimensional beam array by the phase grating 131. For the present, it may be assumed that a two-dimensional beam array is generated, as shown in FIG. 3.

Figure 3:
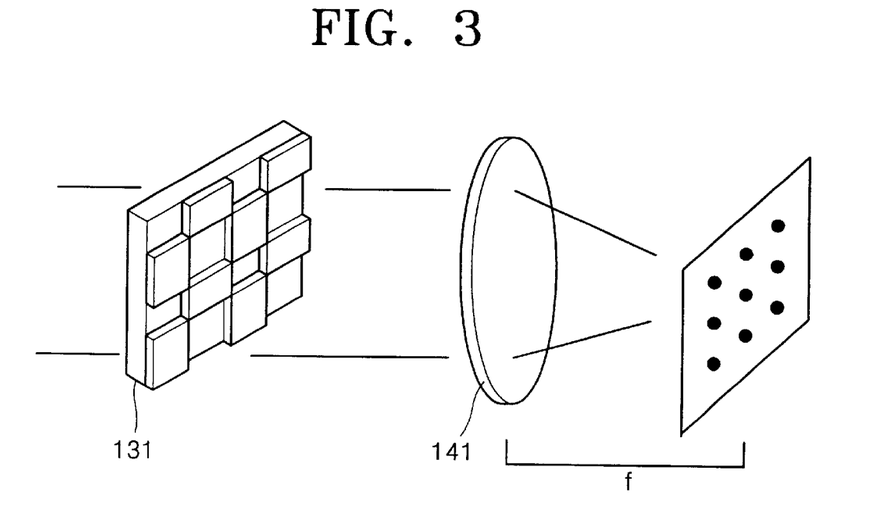
FIG. 3 illustrates the principle of generating a multiple-beam array by the phase grating of FIG. 2.

In FIG. 3, when the collimated beam is incident onto the phase grating 131, the incoming collimated beam is split into a plurality of diffraction beams that form an array, by a diffraction grating of the phase grating 131, and in turn focused into an array of light spots by the Fourier transform lens 141. It is desirable that individual light spots have the same intensity, which is determined by the design of the phase grating 131.

Referring to FIG. 2, assuming that grating periods for the X- and Y-axis directions of the phase grating are $d_x$ and $d_y$, respectively, the wavelength of the beam emanated from the light source 111 is $\lambda$, and the focal length of the Fourier transform lens 141 is f, the distances between spots focused onto the reflective SLM 161 in the X-axis and Y-axis directions, $S_x$ and $S_y$, respectively, are expressed by equation (1)

$$S_x = \frac{\lambda f}{d_x} \quad (1)$$
$$S_y = \frac{\lambda f}{d_y}.$$

Figure 4A:
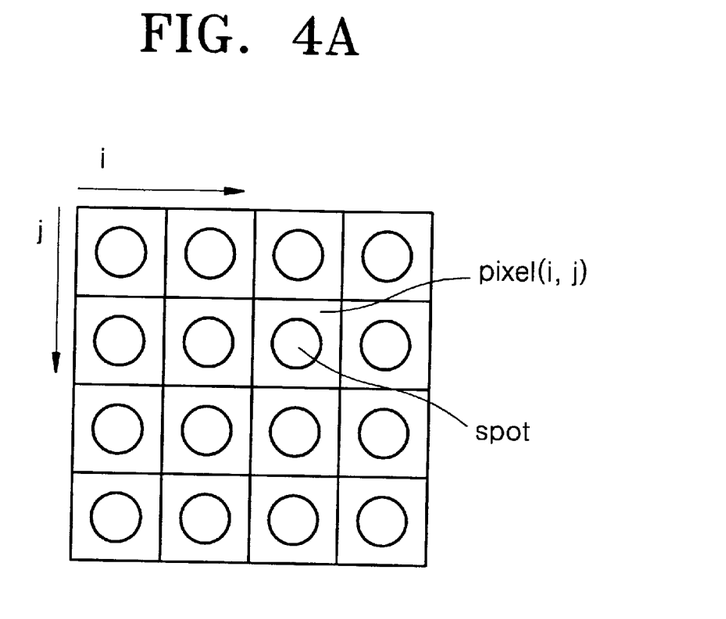
FIGS. 4A and 4B are diagrams illustrating exemplary structures of the reflective spatial light modulator of FIG. 2.
Figure 4B:
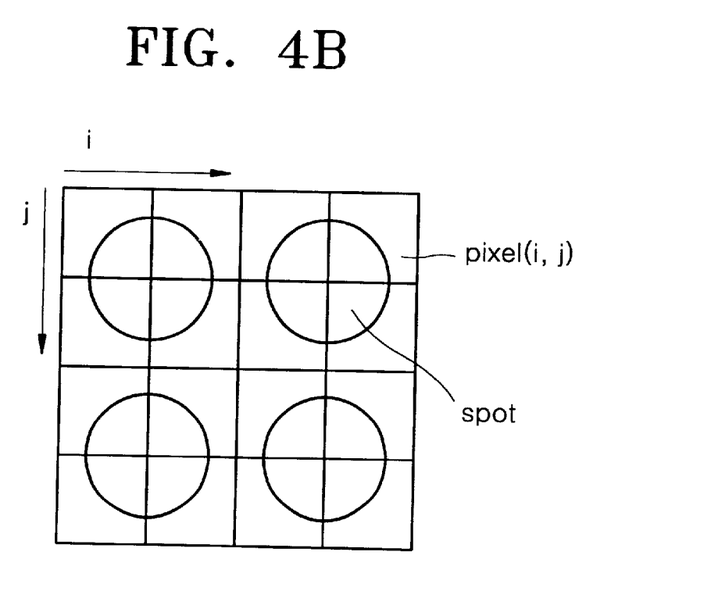

Also, the beam spot array from the Fourier transform lens 141 is focused through the polarizing beam splitter 151 on a pixel array (i, j) of the reflective SLM 161, the beam spots of the array correspond one-to-n to the pixels of the pixel array (i, j), where n is a natural number. FIG. 4A shows a one-to-one correspondence between the beam spots and pixels, and FIG. 4B shows a one-to-two correspondence between the beam spots and pixels.

Figure 5:
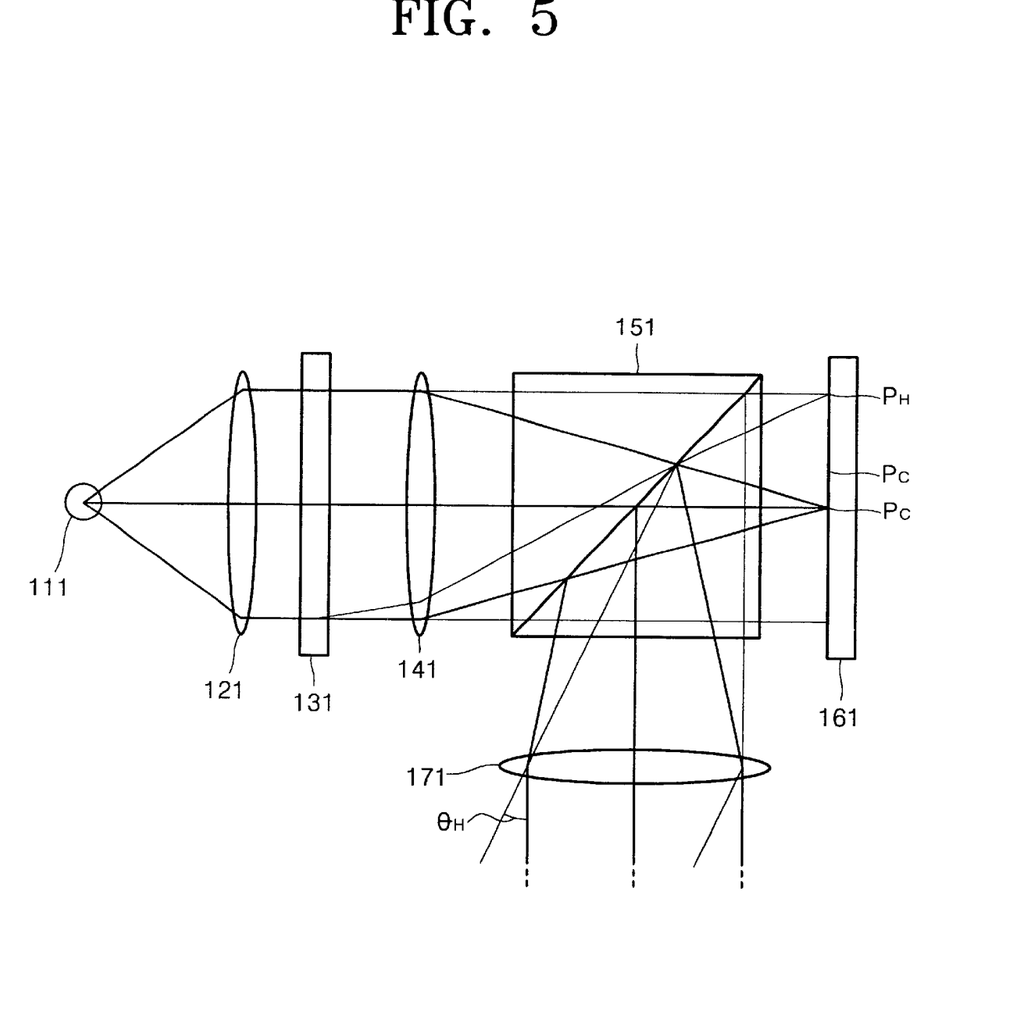
FIGS. 5 and 6 are diagrams illustrating the operation of the independent coherent beam array generating apparatus shown in FIG. 2.

The multiple-beam array in FIG. 5 is selectively reflected by the reflective SLM 161. The reflective SLM 161 may be a micro-mirror reflector with a micro-mirror array which provides the same function as the pixel array, or a reflective liquid crystal display (LCD) panel, which permits selective reflection of beam spots incident onto pixels.

The selectively reflected beam passes back the beam splitter 161 and is directed in a direction toward the collimating lens 171, which is different from its initial incoming direction to the reflective SLM 161. The incident beam from the polarizing beam splitter 161 is converted into a collimated beam by the collimating lens 171. The angle between the collimated beam and the central optical axis is determined by the position of the spot on the pixel array of the reflective SLM 161.

FIG. 5 shows the maximum dislocation angle $\theta_H$ between the collimated beams, which are reflected by the reflective SLM 161 at an outermost pixel $P_H$ and the central pixel $P_C$ thereof, respectively, and passed through the polarizing beam splitter 151 and the second collimating lens 171.

Figure 6:
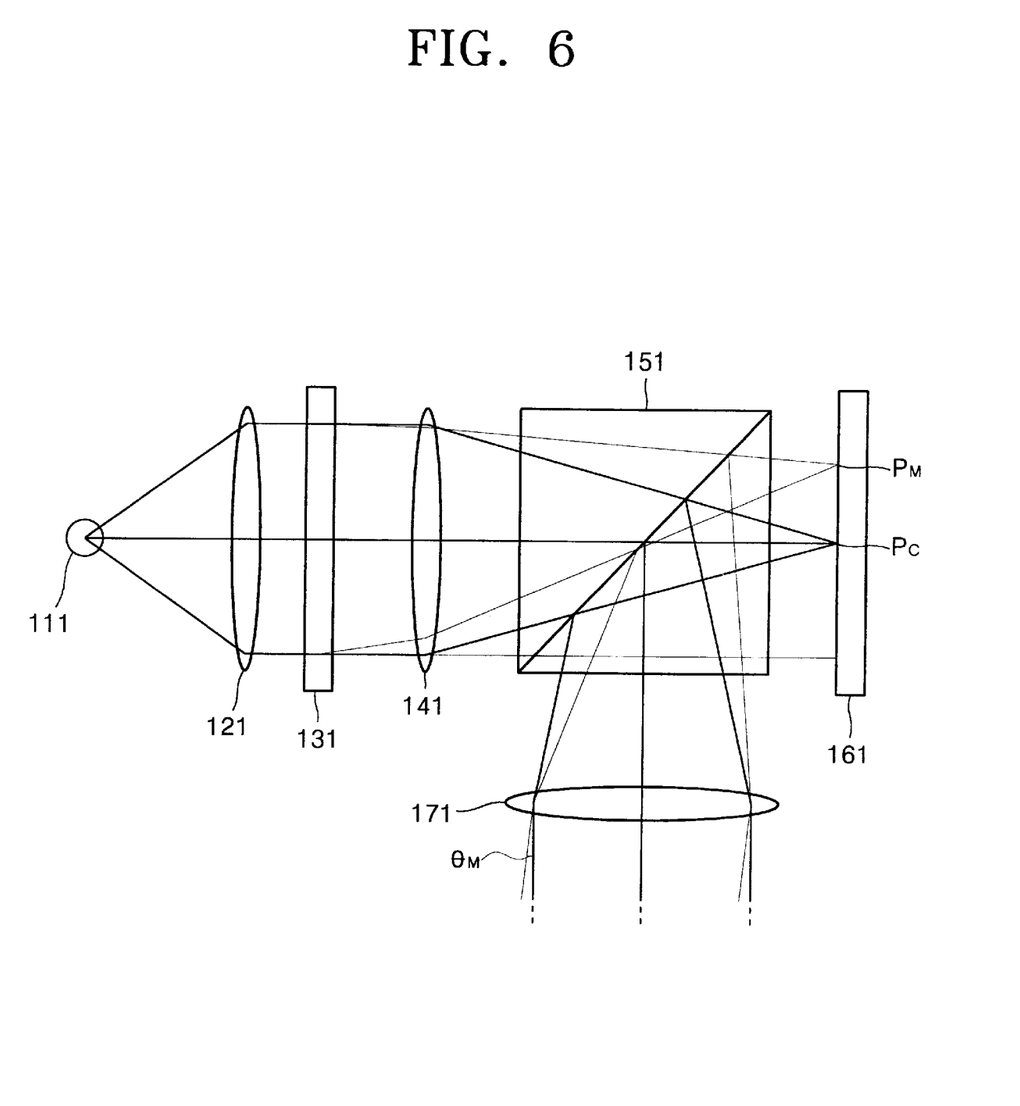

FIG. 6 shows the maximum dislocation angle $\theta_M$ between the collimated beams, which are reflected by the reflective SLM 161 at a ¼-height pixel $P_H$ and the central pixel $P_C$ thereof, respectively, and passed through the polarizing beam splitter 151 and the second collimating lens 171.

Figure 7:
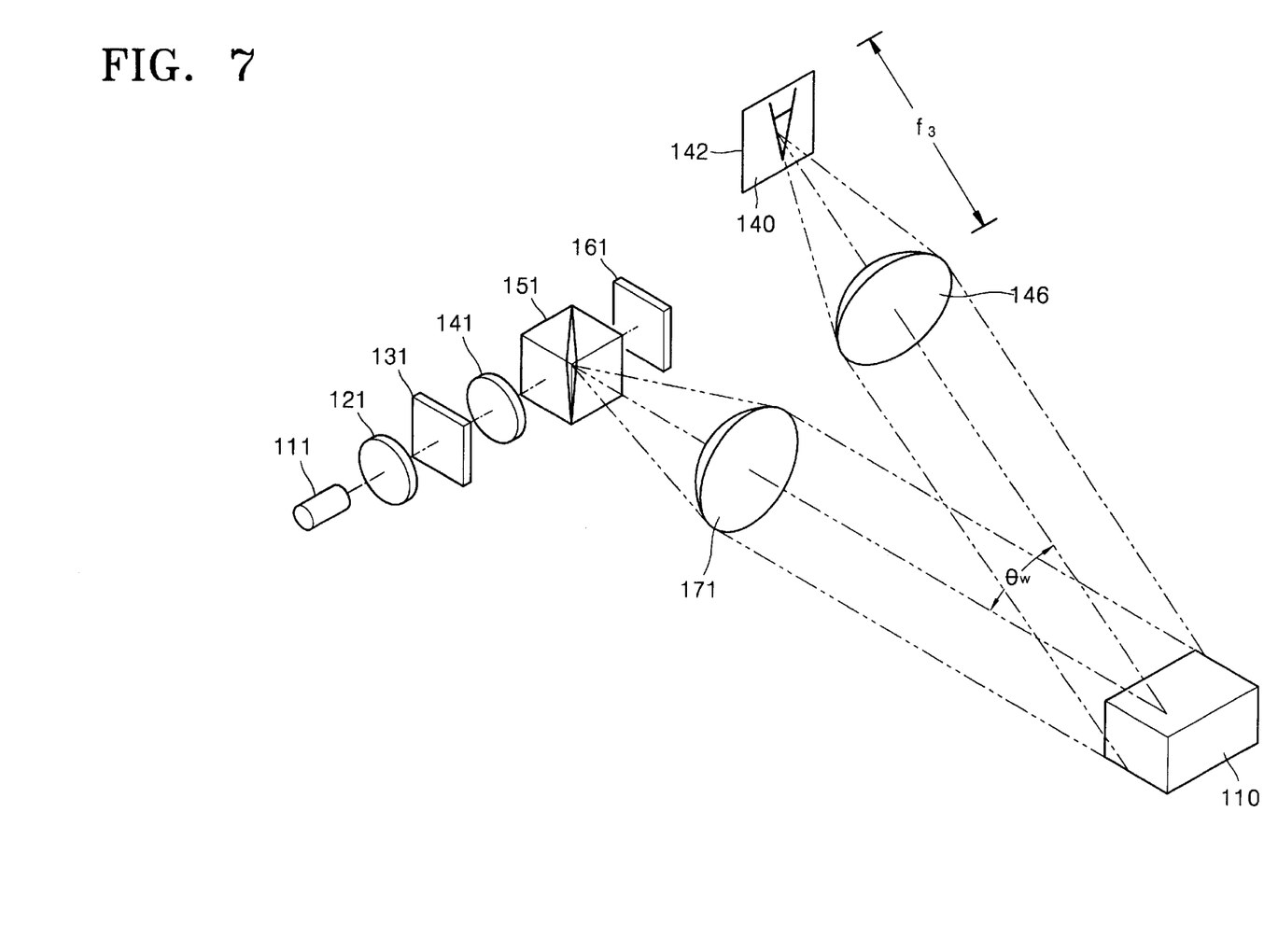
FIGS. 7 and 8 illustrate the structure of a holographic memory adopting the independent coherent beam array generating apparatus of FIG. 2, for recording and reading operations, respectively.
Figure 8:
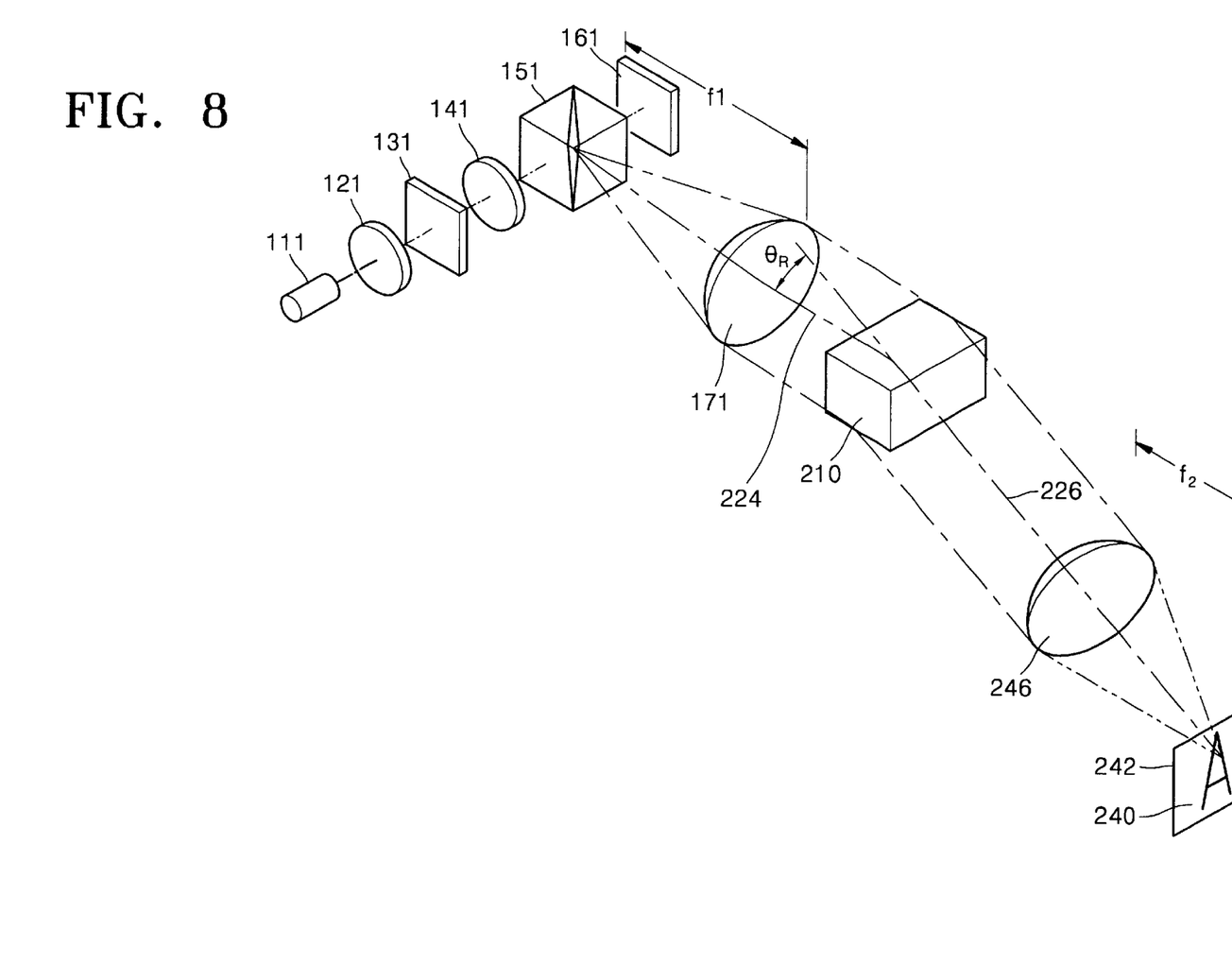

FIGS. 7 and 8 illustrate a holographic memory adopting the independent coherent beam array generating apparatus according to the present invention, for recording and reading operations, respectively. As shown in FIG. 7, for the recording operation of images onto a holographic recording medium 110, by the interference of an objective beam and a reference beam, an image 140 presented on an image light source 142 is written through the recording collimating lens 146 of a focal length $f_3$ to the holographic recording medium 110, by the interference with the collimated beams respectively from the second collimating lens 171 and the recording collimating lens 146. Also, by varying the writing angle $\theta_W$ between the two collimated beams originated from the light source 111 and the image light source 142, different images are superimposed and written to the holographic recording medium 110, which results in a high-density image recording.

As shown in FIG. 8 during the reading operation of image information from a holographic recording medium 210, images are read out according to the incident angle $\theta_R$ of the reference collimated beam from the independent coherent beam array generating apparatus for reading, i.e., the angle between a reference optical axis 224 and an image optical axis 226. In other words, the images can be read selectively by only the reference collimated beam incident onto the holographic recording medium 210, of which the incident angle $\theta_R$ for reading is the same as that of the reference beam for recording. Then, the images read from the holographic recording medium 210 are sequentially displayed as an image 240 on an imaging plane 242 through a focusing lens 246 of a focal length $f_2$. In FIG. 8, $f_1$ denotes the focal length of the second collimating lens 171.

As described above, the independent coherent beam array generating apparatus according to the present invention, which ensures high-efficient independent coherent beams from a single light source, are implemented by using a phase grating and an SLM. The number of multiple beams to be used as a light source for high-density recording and reading can be adjusted by varying the design of the phase grating. Regardless of the number of light sources required in various applications, once the beam array generating apparatus according to the present invention is adopted to the applications, the desired function of the applications can be implemented at low cost. In addition, the structure and the assembly of the system is simple.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for generating an independent coherent beam array, comprising:

a single light source;

a first collimating lens for collimating the beam emanated from the light source;

a phase grating for splitting the collimated beam from the first collimating lens into a plurality of diffraction beams;

a Fourier transform lens for focusing the diffraction beams from the phase grating into beam spots by Fourier transformation;

a reflective spatial light modulator for selectively reflecting the beam spots from the Fourier transform lens;

a polarizing beam splitter for passing the beam spots from the Fourier transform lens toward the reflective spatial light modulator, and changing the path of the beams reflected by the reflective spatial light modulator; and a second collimating lens for collimating the beams reflected by the reflective spatial light modulator and incident via the polarizing beam splitter.

2. The apparatus of claim 1, wherein assuming that grating periods for the X- and Y-axis directions of the phase grating are $d_x$ and $d_y$, respectively, and the wavelength of the beam emanated from the light source is $\lambda$, the focal length of the Fourier transform lens is f, the distances between spots focused onto the reflective spatial light modulator in the X-axis and Y-axis directions, $S_x$ and $S_y$, respectively, are expressed by equations $$S_x = \frac{\lambda f}{d_x}$$

$$S_y = \frac{\lambda f}{d_y}.$$

3. The apparatus of claim 1, wherein the reflective spatial light modulator is constructed of a micro-mirror reflector or a reflective liquid crystal display panel.

4. The apparatus according to claim 1, wherein the beam spots are focused on a pixel array of the reflective spotted light indicator.

5. The apparatus according to claim 4, wherein the beam spots correspond one-to-N to the pixels of the pixel array, where N is a natural number.

* * * * *